O. S. Garretson,
Mop Holder.
Nº 67,643.    Patented Aug. 13, 1867.
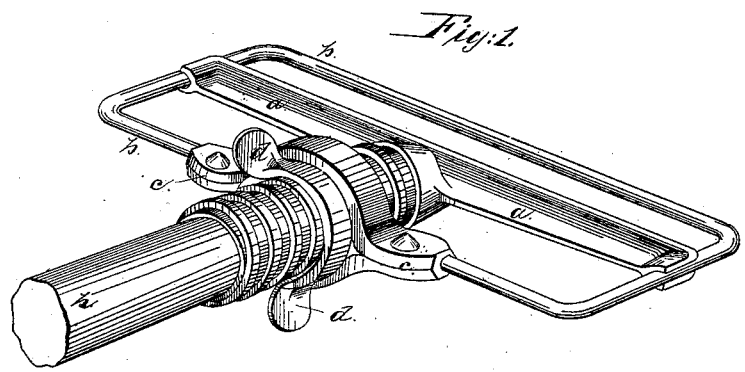
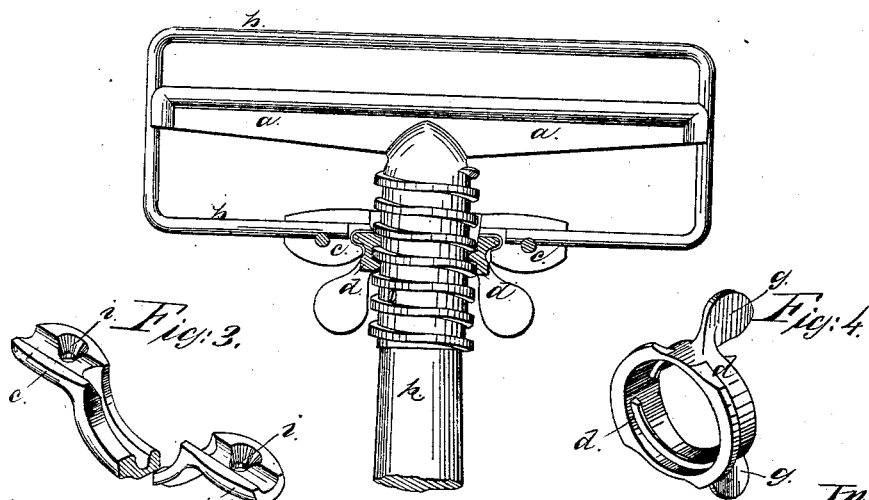
Witnesses:
S. G. Burnt
J. G. Garretson
Inventor:
O. S. Garretson

United States Patent Office.

OLIVER S. GARRETSON, OF CINCINNATI, OHIO.

Letters Patent No. 67,643, dated August 13, 1867.

IMPROVED MOP-HEAD.

*The Schedule referred to in these Letters Patent and making part of the same.*

TO ALL WHOM IT MAY CONCERN:

Be it known that I, O. S. GARRETSON, of the city of Cincinnati, in the county of Hamilton, and State of Ohio, have invented a new and useful improvement in the construction of Mop-Heads; and I do hereby declare that the following is a full, clear, and exact description thereof, reference being had to the accompanying drawings, making a part of this specification, in which—

Figure 1 is a perspective view of the head with a part of the handle attached, the parts being put together complete.

Figure 2 is an elevation of the same, part of the nut and part of the collar of the loose jaw being removed to show the manner in which the flange of the nut enters the collar, and, by being rotated, acts on the screw of the shank or handle, and makes the loose jaw recede from or approach the fixed jaw or cross-head; also the manner of connecting the parts of the loose jaw together.

Figure 3 is a perspective view of part of that part of the loose jaw that forms the collar broken in two to show the recess in which the flange of the nut plays, and the recess designed to receive and retain the smaller parts of the same, or that part that may be formed of wire, as here represented, with the holes by which with rivets the parts are secured together.

Figure 4 is the nut shown in perspective.

Like letters indicate corresponding parts of all the figures.

My improvement in mop-heads chiefly consists in constructing that part of the loose jaw that forms the collar in two parts or halves, with the inner surfaces properly grooved to receive and retain the flange or wings of the nut, and to allow it to have a free rotatory motion, by which means the parts with the recesses and rivet-holes may be cast complete, requiring no drilling or reaming in putting together.

As represented in fig. 1, $a\ a$ is the fixed jaw or cross-head, and is cast hollow to receive the handle $h$. In fig. 2 the loose jaw is marked $b\ b\ c\ c$; and here one part of it, marked $c\ c$, is removed, the better to show the recess in which the flange of the nut $d\ d$ plays. Part of the nut is also removed to show how the thread of the screw on its inner surface acts on the screw on the shank or handle $h$, and the flange is retained in the recess in the loose jaw, when, by rotating the nut by the thumb-pieces $g\ g$, fig. 4, the loose jaw $b\ b\ c\ c$ must recede from or approach the fixed jaw, for the purpose of receiving and retaining the mop. Fig. 4 is the nut, shown in perspective, with one thread of a screw on its inner surface, to match the screw on the shank or handle $h$, with its thumb-pieces $g\ g$, by which it is rotated. Part of the flange on its outer surface is also lacking, better to adapt it to be moulded and cast without coring.

The important advantage gained by my construction of the mop-head is that, by constructing that part of the loose jaw that forms the collar for the nut in two parts or halves, it, with its recesses and rivet-holes, may be cast complete, and will require no drilling or reaming in putting together, a great saving of labor in constructing, and when done forms a neat, compact, and durable article.

The operation or manner of using it is to turn the nut by its thumb-pieces $g\ g$, fig. 4, and the loose jaw recedes from the fixed jaw or cross-head, and the mop may be inserted. Turning the nut in an opposite direction brings the loose jaw and the cross-head near together, and the mop is held firmly in position.

What I claim as my invention, and desire to secure by Letters Patent, is—

Making the collar of the loose jaw in two parts, so that the nut $d\ d$ may be placed between them; and, when connected together, the collar surrounds the nut and retains it in position, for the purpose above set forth.

In testimony of which invention I hereunto set my hand.

O. S. GARRETSON.

Witnesses:
  Jos. H. WOODRUFF,
  JOHN G. GARRETSON.